US007894169B2

(12) United States Patent
Valdez et al.

(10) Patent No.: US 7,894,169 B2
(45) Date of Patent: Feb. 22, 2011

(54) HIGH RESISTANCE GROUND PROTECTION EMPLOYING AC DRIVE CHARACTERISTICS

(75) Inventors: Carlos Rodríguez Valdez, Glendale, WI (US); Russel Kerkman, Milwaukee, WI (US); David Dahl, Cedarburg, WI (US); Jeffrey McGuire, Franklin, WI (US); Nickolay Guskov, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 197 days.

(21) Appl. No.: 12/131,195

(22) Filed: Jun. 2, 2008

(65) Prior Publication Data
US 2009/0296289 A1 Dec. 3, 2009

(51) Int. Cl.
*H02H 3/00* (2006.01)
(52) U.S. Cl. .......................................... 361/47; 361/42
(58) Field of Classification Search .............. 361/42–50
See application file for complete search history.

(56) References Cited
U.S. PATENT DOCUMENTS

| | | | |
|---|---|---|---|
| 4,247,879 A | * | 1/1981 | Elms et al. ................... 361/45 |
| 4,297,738 A | * | 10/1981 | Lee ............................. 361/42 |
| 4,706,012 A | | 11/1987 | Kerkman et al. |
| 5,245,498 A | * | 9/1993 | Uchida et al. ................. 361/47 |

OTHER PUBLICATIONS

IEEE Industry Applications Magazine Article—Finding Fault—by Marcelo Valdes, Tom Papallo, and Bill Premerlani Sep./Oct. 2007 pp. 24-30.
National Electrical Code Internet Connection Articles—High Resistance Grounding—by Andre Cochran pp. 1-4 Aug. 12, 2004.

* cited by examiner

Primary Examiner—Danny Nguyen
(74) Attorney, Agent, or Firm—Quarles & Brady LLP; Alexander R. Kuszewski; John M. Miller

(57) ABSTRACT

A method and apparatus for identifying a ground fault in a motor drive system that includes at least one three phase power conditioner that is linked to three phase supply lines and to positive and negative DC buses, the method comprising the steps of controlling the power conditioner at an operating frequency to convert power, while controlling the power conditioner to convert power, controlling the power conditioner to apply a common mode signal on each of the three phase supply lines where the common mode signal has a frequency that is different than the operating frequency, sensing the common mode signal on at least one of the three phase supply lines and when the common mode signal on the at least one of the three phase supply lines is greater than a threshold level, indicating that a ground fault has occurred.

23 Claims, 3 Drawing Sheets

HIGH RESISTANCE GROUND PROTECTION EMPLOYING AC DRIVE CHARACTERISTICS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to ground fault protection for use with electrical systems and more specifically to high resistance ground fault protection methods and apparatus.

A typical power/drive system includes a converter, an inverter and a mechanical load such as a motor. The converter is typically linked to a three phase source that provides three phase AC power and converts the three phase power to DC power across positive and negative DC buses. The DC buses feed the inverter which generates three phase AC power on output lines that are provided to the load. The inverter controls the three phase AC voltages and currents to the load so that the load can be driven in a desired fashion. Cables connect the source to the converter and also connect the inverter to the load.

Power/drive systems require protection from inadvertent cable and load (e.g., motor) failures which can lead to undesirable ground faults. The root cause of cable failures is often cable insulation breakdown and therefore most ground faults occur in the cables between the power source and the converter or between the inverter and the load. When a ground fault occurs, the results can be extremely costly. For instance, ground faults often result in power interruptions, equipment failure and damage, uncoordinated system decisions with potential for overall plant interruptions, degraded or lost production and overall customer frustration.

There are generally three ways to deal with the possibility of ground faults including ungrounded systems, solidly grounded systems and high resistance systems. In a solidly grounded system, when a fault occurs the system is automatically grounded and the entire process associated with the system is halted until the fault condition is eliminated. In addition to reducing productivity when they shut down, the solidly grounded systems also have problems with excessive currents that often damage system components when faults occur.

In ungrounded systems, the system continues to operate until the system is controlled to shut down for routinely scheduled maintenance at convenient times that do not appreciably affect productivity or the system fails due to equipment damage from a second phase to ground fault or equipment failure from a restriking fault raising the voltage to unacceptable levels.

In high resistance systems, system signals are monitored to identify operating characteristics that indicate the beginnings of fault conditions and thereafter a system operator is supposed to shut down the system for repairs at a convenient time and prior to occurrence of a full fault condition.

In a three phase system, it is know that power/drive systems can operate after a single phase fault occurs but that the system cannot operate when two phases fault concurrently. Thus, from the time a first ground fault occurs, system reliability is at risk should a second fault occur. The possibility of a second fault is increased because the first fault increases the phase to ground voltage for the un-faulted phases by as much as the square root of three. Thus, notice of and timely attention to a first fault are pre-requisites for a high resistance system to operate properly.

Once a fault is detected, a power/drive system has to be shut down and an engineer has to identify the cause of or condition related to the fault and eliminate the cause or condition. Identifying fault cause can be a frustrating process, especially in three phase systems that, in some cases, may have cables that are several hundred or even thousand feet long.

Prior to the advent of high resistance fault systems, because of the need for process continuity in many facilities, ungrounded systems were most prevalent. However, experiences with multiple failures due to arcing ground faults has resulted in a change in philosophy over the use of ungrounded systems and high resistance grounded systems are quickly becoming the norm. Because of the ability to control system shut down times and to only shut down when evidence of a fault can be identified, high resistance systems are often seen as advantageous.

Known systems for detecting utility line to ground faults in a high resistance ground system sense the current in the HRG and determine if the sensed current exceeds a threshold. The sensed current is assumed to be zero sequence, a phrase meaning a component that is common to all three phases and that is at the system operating frequency (e.g., where a load is operating at 60 Hz, the zero sequence component would also be a 60 Hz component). In these systems, when either the HRG current or the zero sequence current formed by summing all three phases is not equal to zero (or is greater than some minimal threshold), the condition is identified as a fault. Here, the phase with the maximum current is selected as the fault phase.

Ground current and zero sequence component approaches have been viewed as simple and straightforward. Unfortunately, with high resistance grounded systems, these approaches are not extremely accurate for a variety of reasons. Most importantly, it has been recognized that under certain cabling and grounding conditions the ground current does not equal zero when no fault is occurring and, in some cases, can add up to zero when a fault actually occurs. In addition, it has been observed that the maximum phase current when a fault is detected is not always related to the faulting phase. These "false fault" indications are a result of complex current paths that exist in high resistance grounded systems with unsymmetrical cable coupling where most systems are uniquely configured and therefore system specific current paths can have very different affects on the ground, common mode and zero sequence components.

To deal with false fault indications, current motor/drive systems typically require customers to, after a system is configured so that system specific current paths exist, set a threshold sensitivity level for zero sequence component unbalance during a commissioning procedure where possible faults will not be reported when the unbalance is below the threshold level. For instance, in some cases the sensitivity threshold may be set to 25% of a drive rating. The sensitivity threshold is typically set by trial and error (i.e., by empirical testing). When sensitivity is too high (i.e., when the threshold is set too low), false ground faults are erroneously reported and when sensitivity is too low (i.e., when the threshold is too high), faults can be missed and it is very difficult to set sensitivity to a suitable level.

For this reason it would be advantageous to have a ground fault detection system that is more reliable than the known zero sequence component systems for use with high resistance ground fault detection systems.

SUMMARY OF THE INVENTION

It has been recognized that, instead of using common mode or zero sequence components of phase currents at operating frequency to identify likely ground fault conditions, common mode currents of a frequency other than the operating frequency can be employed. Unlike the ground components from operating frequency components in a three-phase system, non-operating frequency common mode currents always add up to a zero value unless a ground fault condition exists. Thus, at least in theory, when any non-operating frequency currents from the three phases add up to a non-zero value, a fault occurs and can be reported. Because of hardware constraints (i.e., sensor sensitivity, processing accuracy limitations, etc.), a threshold for fault activity is still set in at least some embodiments, but the threshold is much lower than in the case of prior zero-sequence component approaches and accuracy is increased appreciably.

In at least some embodiments the non-operating frequency current component monitored is a harmonic of the operating frequency. For instance, in some embodiments the non-operating frequency current component is the third harmonic. Here, in at least some embodiments three phase modulating waveforms used to drive an inverter or a converter already have the third harmonic common mode component in them so that the modulating waveforms do not have to be altered in any way to generate the required third harmonic. For instance, where the well known space-vector waveforms are employed to drive an inverter/converter, the waveforms already include the third harmonic.

Consistent with the above, at least some embodiments of the invention include a method for identifying a fault in a motor drive system that includes at least one three phase power conditioner that is linked to three phase supply lines and to DC buses, the method comprising the steps of controlling the power conditioner at an operating frequency to convert power, controlling the power conditioner to apply a common mode signal on each of the three phase supply lines where the common mode signal has a frequency that is different than the operating frequency, sensing the non-operating frequency signal on at least one of the three phase supply lines and, when the non-operating frequency signal on at least one of the three phase supply lines is greater than a threshold level, indicating that a ground fault has occurred.

In some cases the power conditioner is controlled to apply a common mode signal that has a frequency equal to a harmonic frequency of the operating frequency. In some cases the harmonic frequency is the third harmonic frequency of the operating frequency. In some embodiments the power conditioner includes a DC to AC inverter while in other embodiments the conditioner includes an AC to DC converter. In some embodiments the power conditioner includes an AC to DC to AC converter. In some embodiments the power conditioner includes an AC to AC converter. In some embodiments the step of sensing the non-operating frequency signal includes sensing the non-operating frequency signals on each of the three phase supply lines. Some embodiments further include the step of comparing the non-operating frequency signals for the three phases to identify the phase associated with the maximum non-operating frequency signal and reporting the phase associated with the maximum non-operating frequency signal. In some cases the method further includes the step of filtering the sensed non-operating frequency signal and using the filtered signal to identify occurrence of a fault.

Some embodiments include an apparatus for identifying a fault in a motor drive system that includes at least one three phase power conditioner that is linked to three phase supply lines and to DC buses, the apparatus comprising a controller that controls the power conditioner at an operating frequency to convert power, the controller, controlling the power conditioner to apply a common mode signal on each of the three phase supply lines where the common mode signal has a frequency that is different than the operating frequency, at least one sensor for sensing the non-operating frequency signal on at least one of the three phase supply lines and a first comparator for, when the common mode signal on the at least one of the three phase supply lines is greater than a threshold level, indicating that a ground fault has occurred.

In some cases the power conditioner is controlled to apply a common mode signal that has a frequency equal to a harmonic frequency of the operating frequency. In some cases the harmonic frequency is the third harmonic frequency of the operating frequency. In some cases the sensor senses the non-operating frequency signals on each of the three phase supply lines. Some embodiments further include a second comparator for comparing the non-operating frequency signals for the three phases to identify the phase associated with the maximum non-operating frequency signal and reporting the phase associated with the maximum non-operating frequency signal. In some cases the apparatus further includes a filter for filtering the sensed non-operating frequency signal, the first comparator comparing the filtered signal to the threshold value. In some cases the sensor has a sampling interval and wherein the filter uses non-operating frequency current signal during previous sampling intervals to predict a next non-operating frequency current signal.

Still other embodiments include an apparatus for identifying a fault in a motor drive system that includes at least one three phase power conditioner that is linked to three phase supply lines and to DC buses, the apparatus comprising a sensor for sensing the non-operating frequency signal on at least one of the three phase supply lines and at least one processor that runs at least one program to perform the steps of controlling the power conditioner at an operating frequency to convert power, controlling the power conditioner to apply a common mode signal on each of the three phase supply lines where the common mode signal has a frequency that is different than the operating frequency, when the non-operating frequency signal on the at least one of the three phase supply lines is greater than a threshold level, indicating that a ground fault has occurred.

Other embodiments include an article of manufacture for use with a motor drive system that includes at least one three phase power conditioner that is linked to three phase supply lines and to DC buses and at least one sensor for sensing a sensed phase current on at least one of the three phase supply lines, the article of manufacture comprising a computer usable medium having a computer readable program code embodied therein for identifying a ground fault in the motor drive system, the computer readable program code means in the article of manufacture comprising, a computer readable program code for causing a computer to control the power conditioner at an operating frequency to convert power and to apply a non-operating frequency signal on each of the three phase supply lines where the non-operating frequency signal has a frequency that is different than the operating frequency, a computer readable program code for causing a computer to filter the sensed phase current to generate a non-operating frequency current signal for the phase and a computer readable program code for causing a computer to use the sensed non-operating frequency signal to determine when a ground fault occurs.

Yet other embodiments include a computer usable medium and a computer readable code embodied on the computer usable medium for use with a motor drive system that includes at least one three phase power conditioner that is linked to three phase supply lines and to DC buses and at least one sensor for sensing a sensed phase current on at least one of the three phase supply lines, the computer readable code comprising computer readable program code devices configured to filter the sensed phase current to generate a non-operating frequency current signal for the phase and computer readable program code devices configured to use the sensed non-operating frequency signal to determine when a ground fault occurs.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
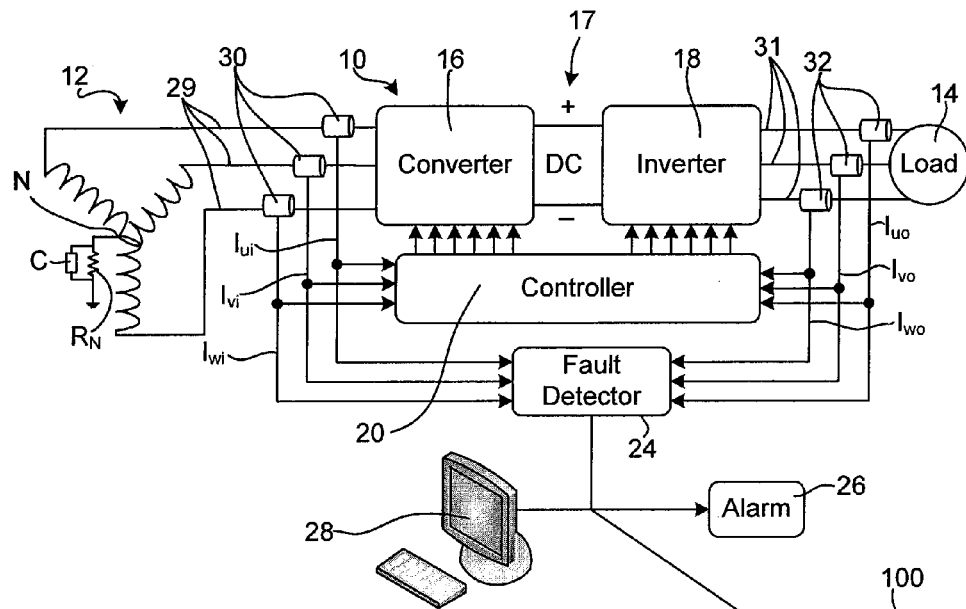
FIG. 1 is a schematic diagram illustrating a system including a fault detector and a controller that is consistent with at least some aspects of the present invention.

Referring now to the drawings wherein like reference numerals correspond to similar elements throughout the several views and, more specifically, referring to FIG. 1, the present invention will be described in the context of an exemplary power/drive system 10 that includes an AC power source 12, a load 14 (e.g., a motor), a converter 16, an inverter 18, a controller 20, a ground fault detector 24, an alarm device or module 26, current sensors 30 and 32 and a plurality of lines or power supply cables that link the components together where a first subset set of supply lines is identified collectively by numeral 29 and a second subset is identified collectively by numeral 31. In at least some embodiments a human-machine interface 28 may also be provided for setting threshold values during a commissioning procedure and/or to report fault detection information to a system operator.

Referring still to FIG. 1, source 12 is shown as a secondary coil of a three-phase transformer that includes a neutral point N and three output nodes, a separate node for each one of the three phases of system 10. In addition, source 12 includes a high resistance ground circuit including a resistor RN and a capacitor C arranged in parallel between neutral node N and ground. Each of the three supply lines labeled 29 connects a separate one of the secondary coils of the transformer to converter 16 to provide three-phase AC voltage thereto. As well known in the power conditioning arts, converter 16 includes a plurality of switching devices that link the three input lines 29 to positive and negative DC buses collectively identified by numeral 17. Controller 20 provides control signals to the switches that comprise converter 116 to facilitate AC to DC conversion.

Referring still to FIG. 1, positive and negative DC buses 17 feed inverter 18. Inverter 18, like converter 16, includes a plurality of switching devices that are arranged to link the DC buses 17 to three-phase output supply lines dcollectively identified by numeral 31 which are in turn linked to load 14. Controller 20 provides control signals to inverter 18 to control the inverter switching devices and facilitate the DC to AC conversion.

Three current sensors collectively identified by numeral 30 are provided, one for each of the converter input supply lines 29, for, as the label implies, sensing current level passing through those lines. The sensors 30 provide their sensed current signals $I_{ui}$, $I_{vi}$ and $I_{wi}$ to controller 20 and are used by the controller to facilitate the AC to DC conversion process. Similarly, separate current sensor 32 are provided for each of the inverter output lines 31 and generate current feedback signals $I_{uo}$, $I_{vo}$ and $I_{wo}$ which are provided to controller 20 and are used by controller 20 to control the DC to AC conversion process.

Referring yet again to FIG. 1, in the embodiment illustrated, each of the current signals $I_{ui}$, $I_{vi}$ and $I_{wi}$ through the input lines 29 and each of the current signals $I_{uo}$, $I_{vo}$ and $I_{wo}$ through the output supply lines 31 is provided to fault detector 24. Fault detector 24 uses the current feedback signals to determine when a ground fault occurs and to generate a signal to notify a system operator when a ground fault occurs. In addition, in at least some embodiments, fault detector 24 may also identify the supply line or phase in which a fault occurs. When a fault occurs, detector 24 may provide a signal to alarm device 26 causing the alarm device to indicate to an operator that a fault has occurred. Similarly, detector 24 may provide information via interface 28 indicating that a fault has occurred and may also provide information regarding the phase in which the fault occurred.

Referring once again to FIG. 1, consistent with at least some aspects of the present invention, controller 20 may be used to control inverter 18 to, while generating the three-phase AC currents on lines 31, inject a common mode signal or component into each of the three phases that is at a frequency other than the operating frequency of the inverter 18. For example, where the inverter 18 is driven at a 60 Hz operating frequency, controller 20 may also inject a third harmonic common mode signal on to lines 31 via inverter 18. While the third harmonic signal may be used for other purposes, according to the present invention, the common mode third harmonic signal is monitored via detector 24 to identify when a ground fault occurs. Similarly, controller 20 may be used to control converter 16 to inject a common mode third or other harmonic frequency on to input supply lines 29 where detector 24 can use the common mode signals to detect ground fault conditions. In at least some embodiments the well known space vector modulating waveforms may be used to control the converter and/or the inverter where the space vector waveforms already include the third harmonic components.

Figure 2:
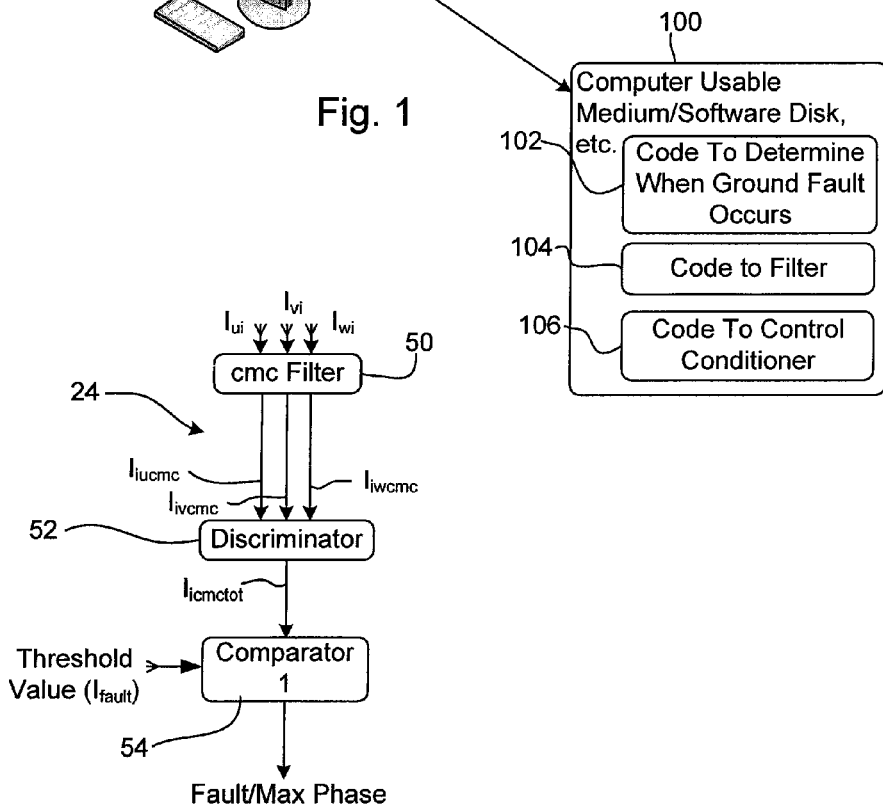
FIG. 2 is a schematic diagram illustrating an exemplary fault detector of FIG. 1.

Referring now to FIG. 2, an exemplary fault detector 24 is illustrated. Exemplary fault detector 24 includes a non-operating frequency component (cmc) filter 50, a summer 52 and first and second comparators 54 and 56, respectively. As the label implies, cmc filter 50 receives feedback currents from line current sensors (e.g., 30 or 32) and filters those current values to identify non-operating frequency currents at the common mode voltage frequency injected by controller 20 for each of the phases. Thus, for example, in FIG. 2, currents $I_{ui}$, $I_{vi}$ and $I_{wi}$ from input supply lines and sensed by sensors 30 are provided to filter 50 which, in turn, identifies three-phase input line non-operating frequency currents $I_{uicmc}$, $I_{vicmc}$ and $I_{wicmc}$. The non-operating frequency currents are provided to discriminator 52. Discriminator 52 determines the phase current with maximum amplitude at the non-operating frequency and outputs that maximum value $I_{imax}$.

Where no fault occurs, in theory, the discriminator outputs should equal zero at all times. However, because of hardware limitations in the sensors and processing circuitry, in practice there is often some error in current measurement or calculation of the common mode current values and therefore, some threshold value $T_{fault}$ is typically provided for the first comparator 54. Where the maximum non-operating frequency current $I_{imax}$ exceeds the threshold value $T_{fault}$, comparator 54 generates a fault signal which is provided to alarm device 26 and/or interface 24 as shown in FIG. 1. When a ground fault occurs, the phase on which the fault occurs is identified by identifying the phase that has the maximum non-operating frequency current value.

Figure 3:
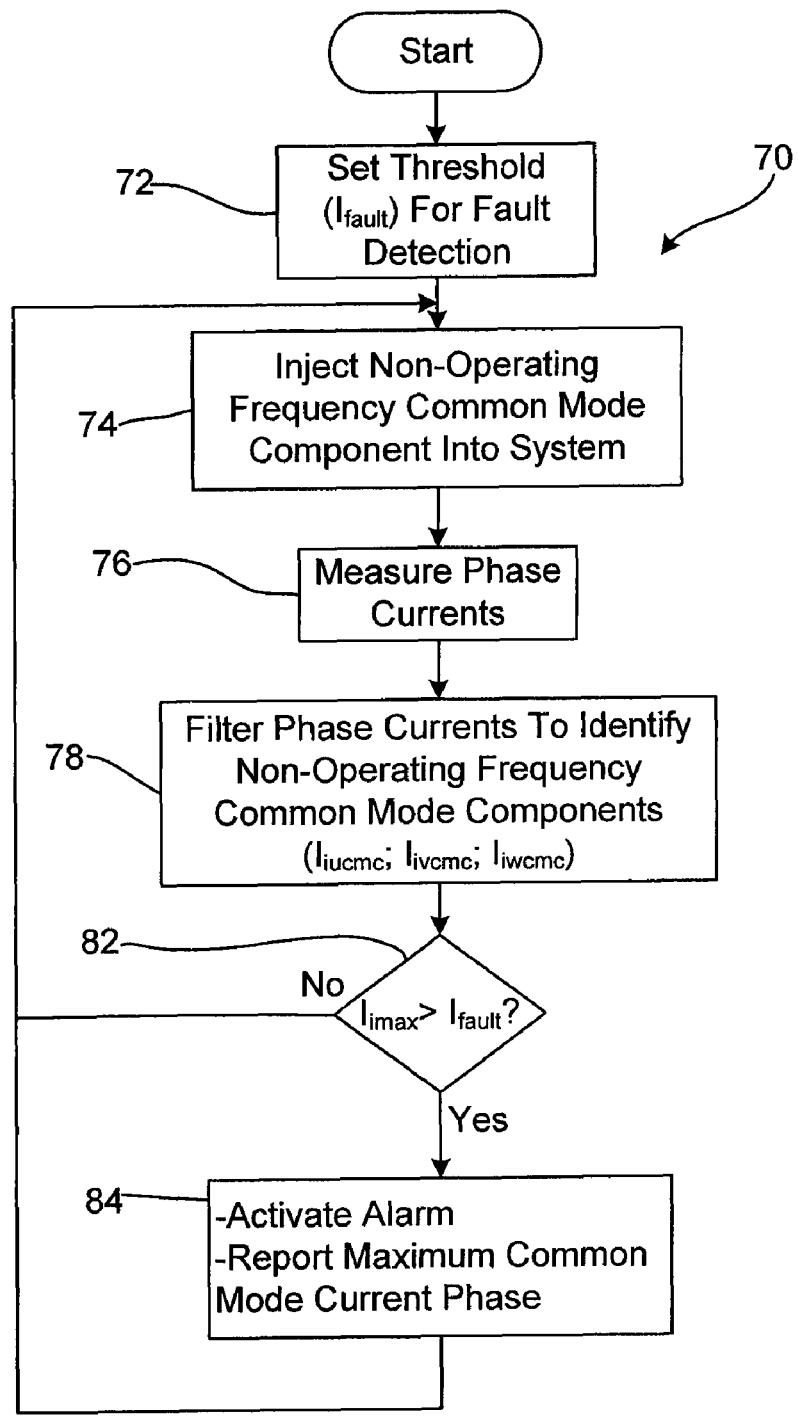
FIG. 3 is a flow chart illustrating a method that may be performed by the system illustrated in FIGS. 1 and 2.

Referring now to FIG. 3, a method 70 that is consistent with the system described above with respect to FIGS. 1 and 2 is illustrated. At block 72, a system operator sets a threshold non-operating frequency current value $I_{fault}$ to be used by the fault detector 24 during the fault detection process. This threshold setting step can be performed during a commissioning procedure although it can also be changed at any time by the system operator. After the threshold non-operating frequency current value has been set at block 72, during normal system operation, controller 20 is controlled to inject a non-operating operating frequency common mode component (e.g., a third harmonic component) into the system via converter 16 and inverter 18 while controlling those components. At block 76, sensors 30 and/or 32 are used to measure phase currents. At block 78 the phase currents are filtered by filter 50 in FIG. 2 to identify the non-operating frequency components.

Referring still to FIGS. 1, 2 and 3, at block 82 the maximum non-operating frequency current $I_{imax}$ is compared to the threshold fault value $I_{fault}$. Where the maximum non-operating frequency current is less than the threshold value $I_{fault}$, control passes back up to block 74 where the process is repeated. Where the maximum non-operating frequency component is greater than the threshold value $I_{fault}$, control passes to block 84 where alarm device 36 is activated and the maximum non-operating frequency phase is reported via interface 28 or some other device.

Referring once again to FIG. 1, while the inventive system has been described above with respect to a full system including a converter and an inverter and six separate current sensing devices 30 and 32, it should be appreciated that, in at least some embodiments, the system may be configured for detecting faults on only a portion of the system cables. For example, in at least some embodiments, the input current sensors 30 may not feed detector 24 and instead only output current detectors 32 may feed detector 24 in which case faults would be monitored only on output supply lines 31. Similarly, in other embodiments, signals from output current sensors 32 may not be provided to detector 24 while signals from sensors 30 are provided whereby faults on lines 29 would be the only faults monitored.

Similarly, it should be appreciated that, current from only one of the supply lines may be provided to fault detector 24 and the non-operating frequency component of that current could be used alone to identify when a ground fault occurs. A single line current can be used to detect ground fault according to the present invention because the non-operating frequency component should always be zero unless a ground fault occurs on one of the phases. In addition, when a ground fault occurs on one of the phases, the non-operating frequency component of the current on each of the phases increases to a measurable level. Thus, the non-operating frequency component of current on any of the three phases can be used to generally detect when a ground fault occurs.

Figure 4:
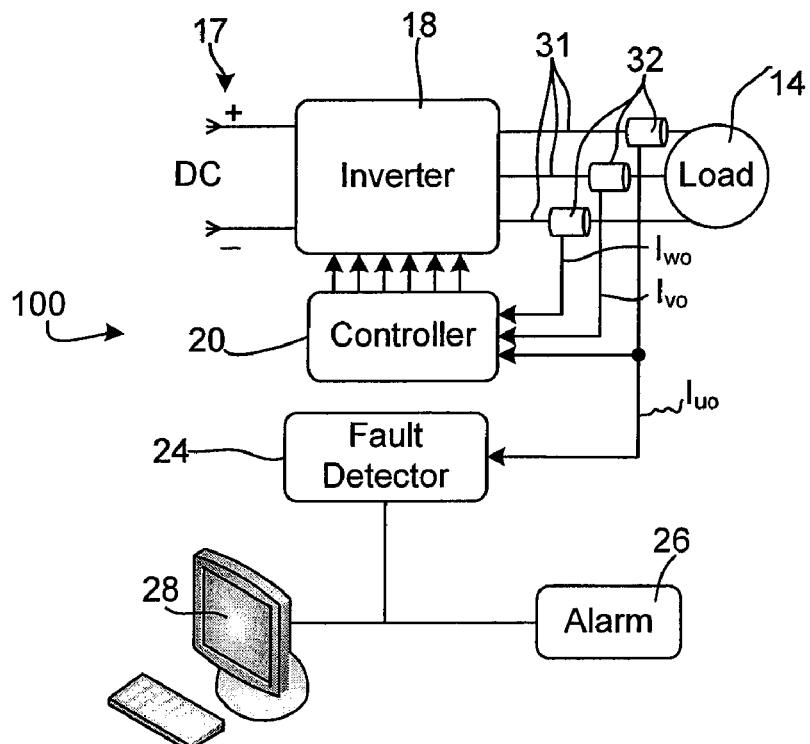
FIG. 4 is a schematic diagram similar to FIG. 1, albeit showing a different system where a single supply line current is provided to a fault detector to detect ground fault conditions.

Consistent with these comments, referring to FIG. 4, a system similar to that shown in FIG. 1 is illustrated where similar components have been labeled with similar numerals. In FIG. 4, however, the front end of system 10 including the converter and other components is illustrated and only a single feedback current $I_{uo}$ associated with one of the inverter output supply lines 31 is provided to fault detector 24. Here, fault detector 24 filters the feedback current $I_{uo}$ and simply compares that value to some threshold value akin to $I_{fault}$ to determine when a fault occurs. When a fault occurs, alarm device 26 is activated and/or information related thereto may be provided via interface 28.

Figure 5:
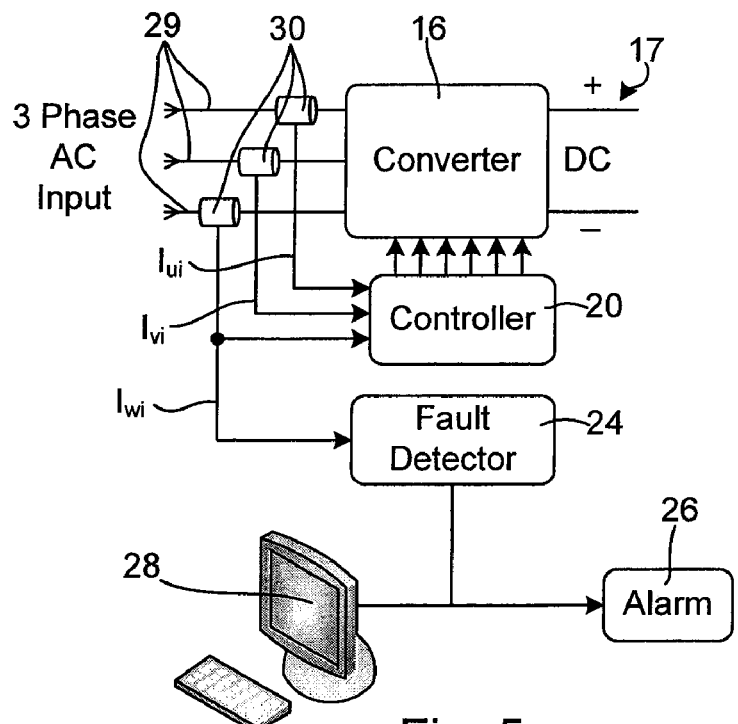
FIG. 5 is a schematic diagram similar to FIG. 1, albeit showing a system where a single input supply line current is provided to the fault detector for use in identifying ground fault conditions.

Referring to FIG. 5, a system similar to that shown in FIG. 1 is illustrated albeit where the back end of the system including the inverter 18 us not illustrated and where a single one of the line currents from input supply lines 29 is provided to detector 24. Here again, detector 24 filters the current $I_{wi}$ to provide a phase current common mode component which is then compared to a threshold value to determine when a ground fault occurs. Ground faults are reported via alarm device 26 and/or interface 28.

In U.S. Pat. No. 4,706,012 (hereinafter "the '012 patent), an analog filter is shown in FIG. 3 that, experiments have shown, can be used as filter 50 in FIG. 2 with particularly advantageous and accurate results. The analog filter in the '012 patent was transformed to a digital form by applying a bilinear or Tustin transformation mapping. When so transformed, integrators were replaced by bilinear mapping which resulted in an algebraic loop which slowed down a simulation process used to examine response of the digital implementation. A real time implementation cannot include an algebraic loop. To eliminate the algebraic loop, system state equations were manipulated to get rid of the loop and the following transfer function resulted:

$$y_{(k+1)} = \frac{2aT_s(u_{(k)} - u_{(k-2)}) + y_{(k)}(8 - 2T_s^2\omega_{0(k)}^2) - y_{(k-1)}(4 - 2aT_s + T_s^2\omega_{0(k)}^2)}{4 + 2aT_s + T_s^2\omega_{0(k)}^2}$$

where a is associated with a Q factor of the filter (i.e., an analog bandwidth equivalent), $\omega_0$ is a center frequency of the common mode signal, $T_s$ is a sampling time of each current sensor, u is a sensed current value, (k) is a current time interval, (k+1) is a next time interval, (k−2) is a time interval two time intervals prior to the current time interval, (k−1) is a time interval immediately preceding the current time interval and y is the output common mode current signal of the filter.

Thus, by digitally implementing the transfer function above in filter 50, a particularly advantageous system results.

Referring again to FIG. 1, the invention also includes a computer usable medium 100 such as a software program stored on a disk or the like that can be used by the processor or computer that comprises the fault detector 24 and the controller 20 to perform the inventive methods and processes. To this end, medium 100 may include various software code sections or components including a code 102 for causing a computer to control the power conditioner at an operating frequency to convert power and to apply a non-operating frequency signal on each of the three phase supply lines where the non-operating frequency signal has a frequency that is different than the operating frequency, a code 104 for causing a computer to filter the sensed phase current to generate a non-operating frequency current signal for the phase and a code 106 for causing a computer to use the sensed non-operating frequency signal to determine when a ground fault occurs.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims. For example other filter types may be employed with transfer functions other than the function above. In addition, other harmonic frequencies can be used as the common mode signal.

To apprise the public of the scope of this invention, the following claims are made:

What is claimed is:

1. A method for identifying a fault in a motor drive system that includes at least one three phase power conditioner that is linked to three phase supply lines and to DC buses, the method comprising the steps of:
   controlling the power conditioner at an operating frequency to convert power;
   controlling the power conditioner to apply a common mode signal on each of the three phase supply lines where the common mode signal has a frequency that is different than the operating frequency;
   sensing the non-operating frequency signal on at least one of the three phase supply lines; and
   when the non-operating frequency signal on the at least one of the three phase supply lines is greater than a threshold level, indicating that a ground fault has occurred.

2. The method of claim 1 wherein the power conditioner is controlled to apply a common mode signal that has a frequency equal to a harmonic frequency of the operating frequency.

3. The method of claim 2 wherein the harmonic frequency is the third harmonic frequency of the operating frequency.

4. The method of claim 1 wherein the power conditioner includes a DC to AC inverter.

5. The method of claim 1 wherein the power conditioner includes an AC to DC converter.

6. The method of claim 1 wherein the step of sensing the non-operating frequency signal includes sensing the non-operating frequency signals on each of the three phase supply lines.

7. The method of claim 6 further including the step of comparing the non-operating frequency signals for the three phases to identify the phase associated with the maximum non-operating frequency signal and reporting the phase associated with the maximum common mode signal.

8. The method of claim 1 further including the step of filtering the sensed non-operating frequency signal and using the filtered signal to identify occurrence of a fault.

9. The method of claim 8 wherein the step of filtering includes solving the following equation:

$$y_{(k+1)} = \frac{2aT_s(u_{(k)} - u_{(k-2)}) + y_{(k)}(8 - 2T_s^2\omega_{0(k)}^2) - y_{(k-1)}(4 - 2aT_s + T_s^2\omega_{0(k)}^2)}{4 + 2aT_s + T_s^2\omega_{0(k)}^2}$$

where y is a filtered current value, a is associated with a Q factor of the filter, $\omega_0$ is a center frequency of the common mode signal, $T_s$ is a sampling time of the current sensor, u is a sensed current value, and k is a time interval where (k) is a current time interval and (k+1) is a next time interval, (k−2) is a time interval two time intervals ago.

10. An apparatus for identifying a fault in a motor drive system that includes at least one three phase power conditioner that is linked to three phase supply lines and to DC buses, the apparatus comprising:
   a controller that controls the power conditioner at an operating frequency to convert power and that controls the power conditioner to apply a common mode signal on each of the three phase supply lines where the common mode signal has a frequency that is different than the operating frequency;
   at least one sensor for sensing the non-operating frequency signal on at least one of the three phase supply lines; and
   a first comparator for, when the non-operating frequency signal on the at least one of the three phase supply lines is greater than a threshold level, indicating that a ground fault has occurred.

11. The apparatus of claim 10 wherein the power conditioner is controlled to apply a common mode signal that has a frequency equal to a harmonic frequency of the operating frequency.

12. The apparatus of claim 11 wherein the harmonic frequency is the third harmonic frequency of the operating frequency.

13. The apparatus of claim 10 wherein the power conditioner includes a DC to AC inverter.

14. The apparatus of claim 10 wherein the power conditioner includes an AC to DC converter.

15. The apparatus of claim 10 wherein the sensor senses the non-operating frequency signals on each of the three phase supply lines.

16. The apparatus of claim 15 further including a second comparator for comparing the non-operating frequency signals for the three phases to identify the phase associated with the maximum non-operating frequency signal and reporting the phase associated with the maximum non-operating frequency signal.

17. The apparatus of claim 10 further including a filter for filtering the sensed common mode signal, the first comparator comparing the filtered signal to the threshold value.

18. The apparatus of claim 17 wherein the filter performs the following equation:

$$y_{(k+1)} = \frac{2aT_s(u_{(k)} - u_{(k-2)}) + y_{(k)}(8 - 2T_s^2\omega_{0(k)}^2) - y_{(k-1)}(4 - 2aT_s + T_s^2\omega_{0(k)}^2)}{4 + 2aT_s + T_s^2\omega_{0(k)}^2}$$

where y is a filtered current value, a is associated with a Q factor of the filter, $\omega_0$ is a center frequency of the common mode signal, $T_s$ is a sampling time of the current sensor, u is a sensed current value, and k is a time interval where (k) is a current time interval.

19. The apparatus of claim 17 wherein the sensor has a sampling interval and wherein the filter uses non-operating frequency current signal during previous sampling intervals to predict a next non-operating frequency current signal.

20. An apparatus for identifying a fault in a motor drive system that includes at least one three phase power conditioner that is linked to three phase supply lines and to DC buses, the apparatus comprising:
  a sensor for sensing the non-operating frequency signal on at least one of the three phase supply lines; and
  at least one processor that runs at least one program to perform the steps of:
    controlling the power conditioner at an operating frequency to convert power;
    controlling the power conditioner to apply a common mode signal on each of the three phase supply lines where the common mode signal has a frequency that is different than the operating frequency;
    when the non-operating frequency signal on the at least one of the three phase supply lines is greater than a threshold level, indicating that a ground fault has occurred.

21. The apparatus of claim 20 wherein the processor performs the step of using the sensed non-operating frequency signal to determine when a ground fault occurs by comparing the common mode signal to a threshold fault current level and, when the sensed non-operating frequency signal is greater than the threshold fault current level, indicating that a ground fault has occurred.

22. An article of manufacture for use with a motor drive system that includes at least one three phase power conditioner that is linked to three phase supply lines and to DC buses and at least one sensor for sensing a sensed phase current on at least one of the three phase supply lines, the article of manufacture comprising:
  a computer usable medium having a computer readable program code means embodied therein for identifying a ground fault in the motor drive system, the computer readable program code means in the article of manufacture comprising:
  a first computer readable program code for causing a computer to control the power conditioner at an operating frequency to convert power and to apply a non-operating frequency signal on each of the three phase supply lines where the non-operating frequency signal has a frequency that is different than the operating frequency;
  a second computer readable program code for causing the computer to filter the sensed phase current to generate a non-operating frequency current signal for the phase; and
  a third computer readable program code for causing the computer to use the sensed non-operating frequency signal to determine when a ground fault occurs.

23. A computer usable medium and a computer readable code embodied on the computer usable medium for use with a motor drive system that includes at least one three phase power conditioner that is linked to three phase supply lines and to DC buses and at least one sensor for sensing a sensed phase current on at least one of the three phase supply lines, the computer readable code comprising:
  a first computer readable program code configured to filter the sensed phase current to generate a non-operating frequency current signal for the phase; and
  a second computer readable program code configured to use the sensed non-operating frequency signal to determine when a ground fault occurs.

* * * * *